(12) United States Patent
Huppunen et al.

(10) Patent No.: US 7,772,738 B2
(45) Date of Patent: Aug. 10, 2010

(54) ELECTRIC MACHINE

(75) Inventors: Jussi Huppunen, Lappeenranta (FI);
Panu Kurronen, Lappeenranta (FI);
Juha Pyrhönen, Lappeenranta (FI)

(73) Assignee: The Switch Electrical Machines Oy, Lappeenranta (FI)

( * ) Notice: Subject to any disclaimer, the term of this patent is extended or adjusted under 35 U.S.C. 154(b) by 620 days.

(21) Appl. No.: 11/632,722

(22) PCT Filed: Jul. 7, 2005

(86) PCT No.: PCT/FI2005/000321

§ 371 (c)(1),
(2), (4) Date: Apr. 13, 2007

(87) PCT Pub. No.: WO2006/008331

PCT Pub. Date: Jan. 26, 2006

(65) Prior Publication Data

US 2007/0284959 A1    Dec. 13, 2007

(30) Foreign Application Priority Data

Jul. 19, 2004  (FI) .................................. 20040996
Jul. 19, 2004  (FI) .................................. 20040999

(51) Int. Cl.
*H02K 1/00*   (2006.01)
*H02K 5/00*   (2006.01)
(52) U.S. Cl. .................. 310/216.001; 310/216.007; 310/89; 310/91
(58) Field of Classification Search ......... 310/216.001, 310/216.007, 216.019, 216.029, 216.034, 310/216.051, 216.055, 216.058, 216.108, 310/216.109, 91, 89
See application file for complete search history.

(56) References Cited

U.S. PATENT DOCUMENTS

| 4,307,310 | A |   | 12/1981 | Wedman et al. |
| 4,315,171 | A | * | 2/1982  | Schaeffer ................. 310/49.53 |
| 4,990,809 | A | * | 2/1991  | Artus et al. ................. 310/192 |
| 5,382,859 | A |   | 1/1995  | Huang et al. |
| 5,783,892 | A | * | 7/1998  | Kanzaki et al. ............. 310/432 |
| 5,818,144 | A |   | 10/1998 | Kim |

(Continued)

FOREIGN PATENT DOCUMENTS

DE    42 34 108 C1    4/1994

(Continued)

*Primary Examiner*—Quyen Leung
*Assistant Examiner*—Leda Pham
(74) *Attorney, Agent, or Firm*—Birch, Stewart, Kolasch & Birch, LLP (57) ABSTRACT

An electric machine which has an arched stator and a cylindrical rotor fitted inside it and in which the flux flows in the radial direction between the stator and the rotor as in a permanent-magnet radial-flux synchronous electric machine, and in which the stator of the machine consists of stator segments (2), each of which has an independent stator core and winding, and the stator segments are arranged to be physically separate from each other so that the stator consists of stator segments arched according to the radius of the rotor and working electromagnetically independently like a linear machine, each stator segment having a stator core and a winding separate from the other stator segments, and that it comprises an overhead supporting frame structure separate from the stator cores and consisting of several longitudinal ribs (41) and parts (42) between them.

8 Claims, 9 Drawing Sheets

U.S. PATENT DOCUMENTS 6,452,303 B1 9/2002 Marioni
6,628,027 B2 * 9/2003 Fuller .......................... 310/91

FOREIGN PATENT DOCUMENTS

| | | |
|---|---|---|
| DE | 101 31 113 A1 | 1/2003 |
| EP | 0 068 214 A1 | 1/1983 |
| EP | 0 230 639 A2 | 8/1987 |
| EP | 0 289 292 A2 | 11/1988 |
| JP | 60-66633 A | 4/1985 |
| JP | 2000-152536 A | 5/2000 |
| JP | 2001-119872 A | 4/2001 |
| WO | WO 00/60719 A1 | 10/2000 |
| WO | WO-03/073583 A1 | 9/2003 |

* cited by examiner

ELECTRIC MACHINE

The present invention relates to a machine that works like a permanent-magnet radial-flux synchronous electric machine, having a stator consisting of stator segments that function like linear machines.

In prior-art wind power stations, a wind rotor drives one or seldom two generators, generally via a gear system. As the wind rotor in larger wind power plants typically rotates at 10-20 rpm, the gear system has a transmission ratio close to 100 to give the generator a rotational speed of e.g. 1500 rpm. In wind mills provided with single-gear planetary gear systems, the transmission ratio is close to 10, so the generator typically rotates at 150-250 rpm. Another type of generator known today is the so-called direct-driven generator, which means that no gear system is used at all and the wind rotor is connected directly to the rotor of the electric machine.

A direct-driven radial-flux generator is disclosed in specification WO-A1-00/60719, which describes a wind power generator that can be directly coupled to the shaft of a wind rotor. The generator has a stator consisting of a number of separate stator modules, which can be mounted, repaired and removed separately and independently of the others. This allows easier installation of the wind power station and especially the generator, because the stator can be transported and also mounted in place in smaller parts.

Specification WO-A1-03/073583 discloses a modular synchronous wind power generator having a stator and rotor provided with windings, wherein both the rotor and the stator consist of separate modules. In the modules, both the stator and the rotor are composed from mutually superimposed segment plates.

Figure 4:
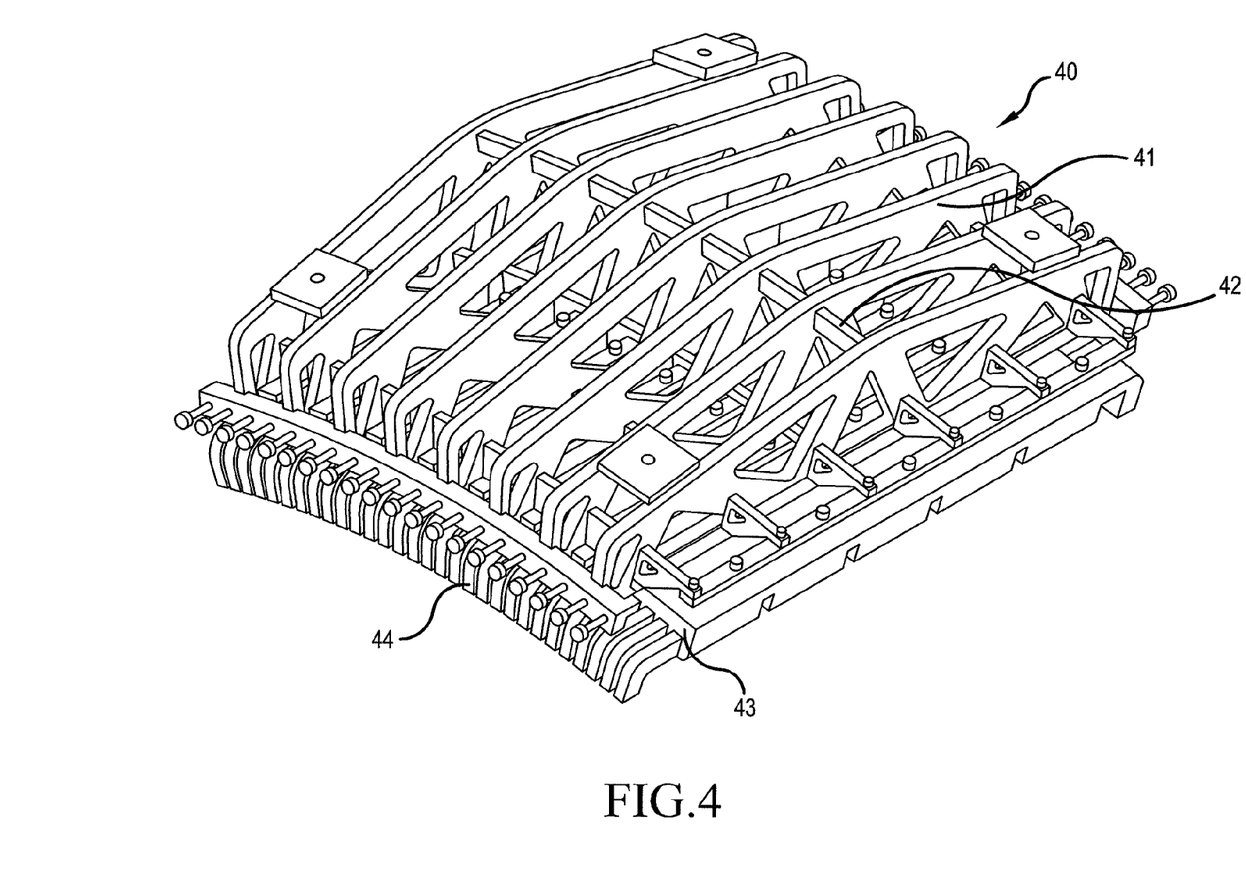
FIG. 4 presents a stator segment and its supporting structure.

In the above-mentioned specification WO 03/073583, a method of building a continuous stator ring is described. According to the claim, the stator ring is divided into at least two parts. FIG. 4 illustrates in particular how the ring segments are locked together so as to form a continuous ring. The ring segments have at each end exactly a half tooth, so that these together form a whole tooth. With this solution, the wind power generator can be assembled from segments on site and wound with cable, and therefore a normal large engineering works is not necessarily needed.

A drawback with prior-art wind power generators is their relatively complex and weighty structure. Moreover, thermal expansion of the separate stator and rotor modules and other similar factors cause difficulties in the installation and operation of the generator.

The object of the present invention is to overcome the drawbacks of prior art and to achieve a solution which uses linear machines that are in principle independent and, when connected mechanically in series, form a structure which looks like a traditional segmental structure but which functionally differs significantly from the machine according to patent application WO 03/073583 representing a continuous stator structure.

The present invention is based on a principle whereby the stator of the electric machine consists of two or more separate independent segments resembling a linear machine, which do not form a continuous ring that would be part of the supporting structure of the machine. Therefore, the forces appearing in the machine are compensated by a special supporting structure. In prior-art solutions, the stator core is assembled from plates by laminating them to form a continuous ring structure that functions as an "arch" bearing part of the magnetic forces.

According to the invention, the linear machines are implemented using e.g. five parallel stator plate packs, which form the magnetic circuit of a linear machine.

The linear machine of the invention is secured e.g. with a T-bar to a supporting structure that bears all the forces. In prior-art solutions, the stator segments are assembled by imbricating them so as to form a continuous ring, which is generally welded by its back part to the frame structure of the machine. Thus, the stator pack forms an "arch" that is involved in supporting the magnetic forces.

As the magnetic cores of linear machines, unlike the magnetic cores of ordinary machines, are not involved in supporting the magnetic forces of the electric machine, we can therefore assemble the whole stator around a permanent magnet rotor already magnetized. Since the stator in a way consists of independent linear machines, each of these can be deactivated or replaced when desirable.

In addition, a light structure and efficient cooling are achieved, and the disadvantages caused by differences in the thermal expansion of separate stator segments can be eliminated.

The features of the wind power generator of the invention are presented in detail in the claims below.

In the following, the invention will be described in detail with reference to an example and the attached drawings, wherein.

Figure 1:
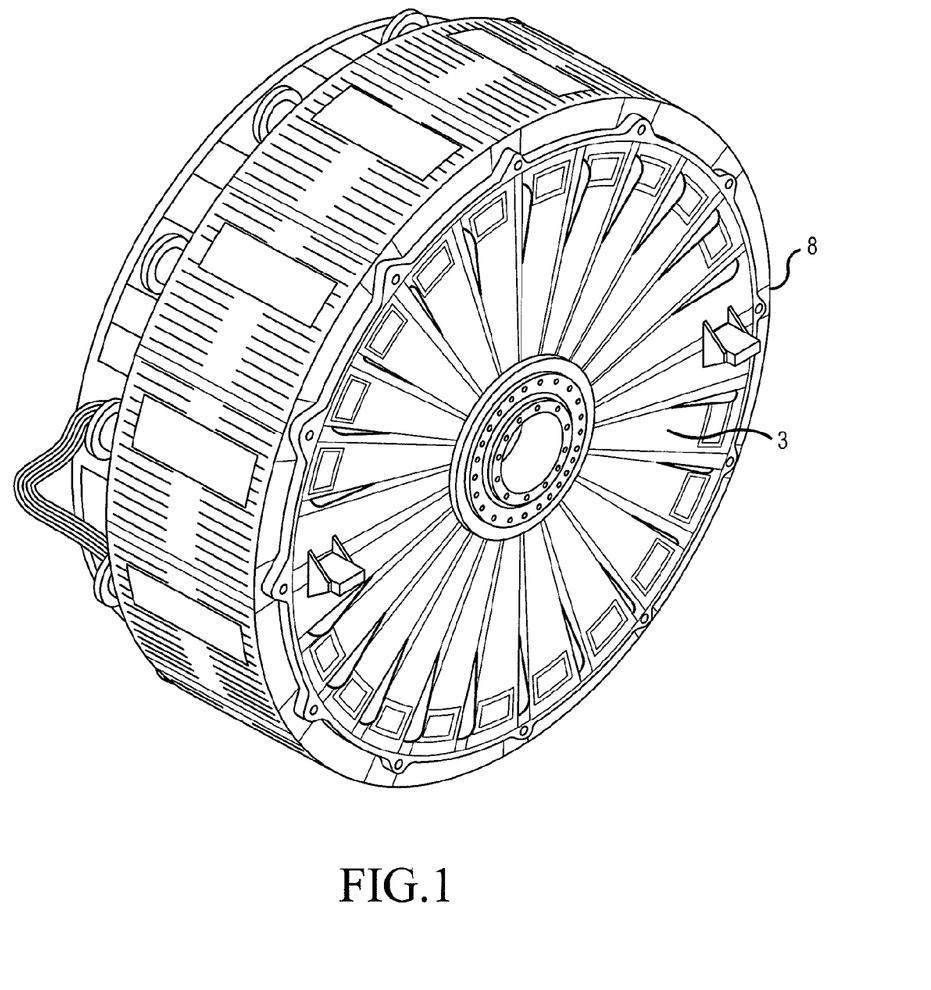
FIG. 1 presents a direct-driven wind power generator according to the invention.
Figure 2:
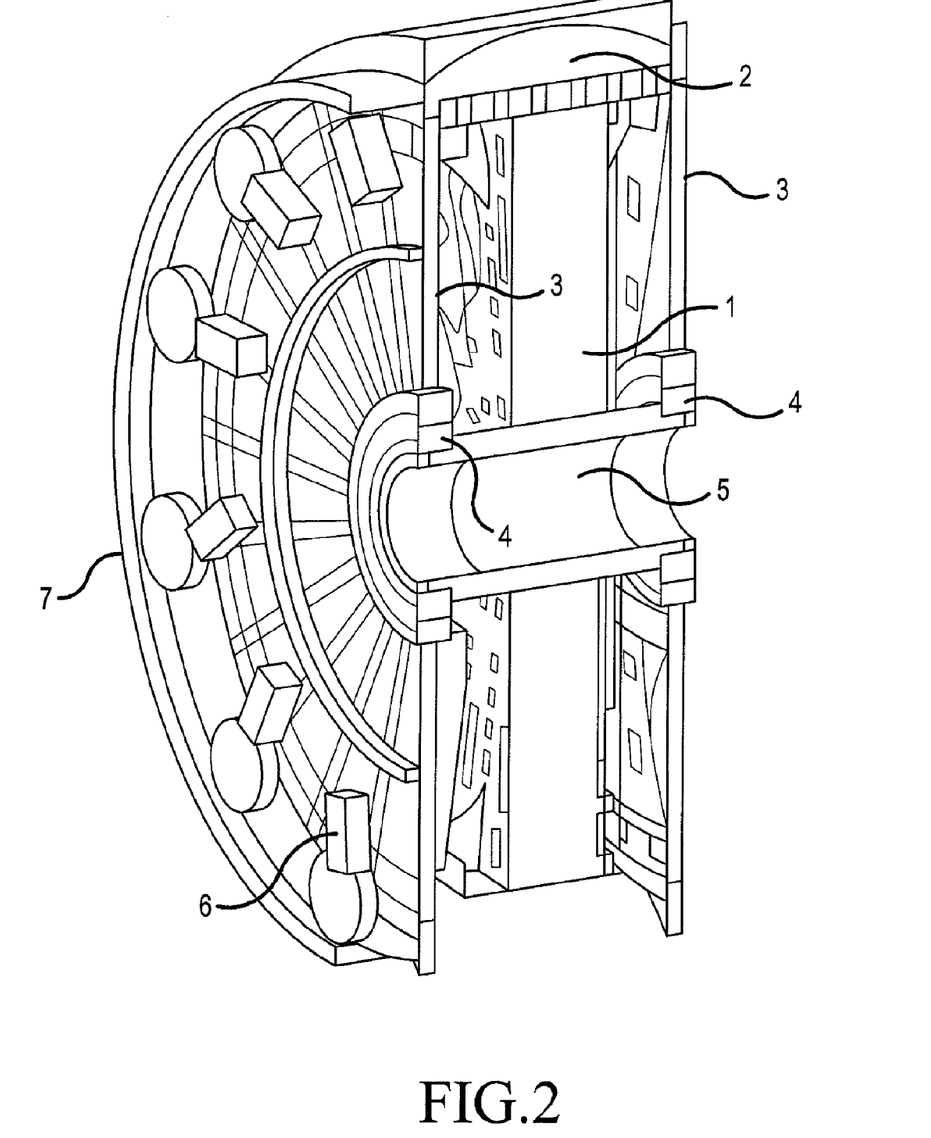
FIG. 2 presents the direct-driven wind power generator according to the invention as a cross-section.
Figure 3:
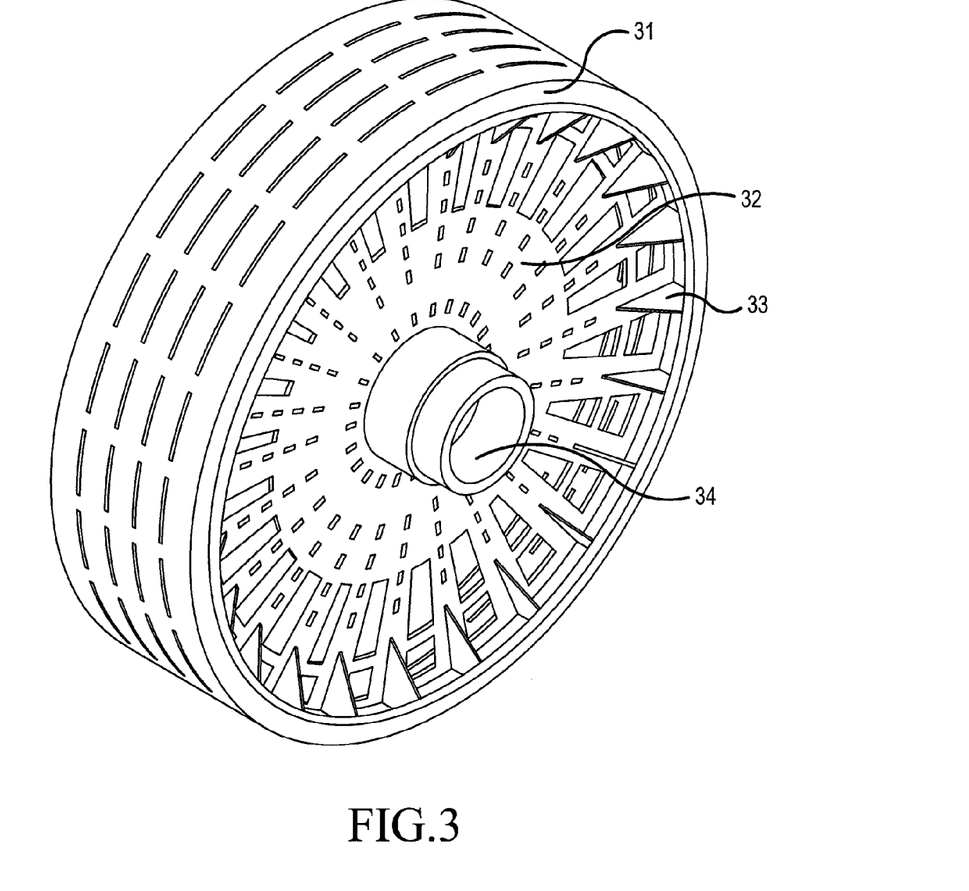
FIG. 3 presents a rotor.

FIGS. 1 and 2 present a direct-driven three-phase generator functioning substantially like a permanent-magnet radial-flux synchronous electric machine and designed for use in a wind power station, wherein the magnetic flux flows in the radial direction between the stator and the rotor as in the case of a permanent-magnet radial-flux synchronous electric machine, and wherein the external arched stator consists of segments which in practice work independently and which, when ready wound, can be called linear machines. The stator comprises e.g. 12 linear machines connected one after the other in series, and the generator has a cylindrical casing 8 provided with end plates 3, a stator 2 and a rotor 1 and an external cabling 7 and a cooling system 6 with piping arranged in the end of the generator. The rotor 1 can be coupled directly to the shaft (not shown) of a wind rotor.

Figure 7:
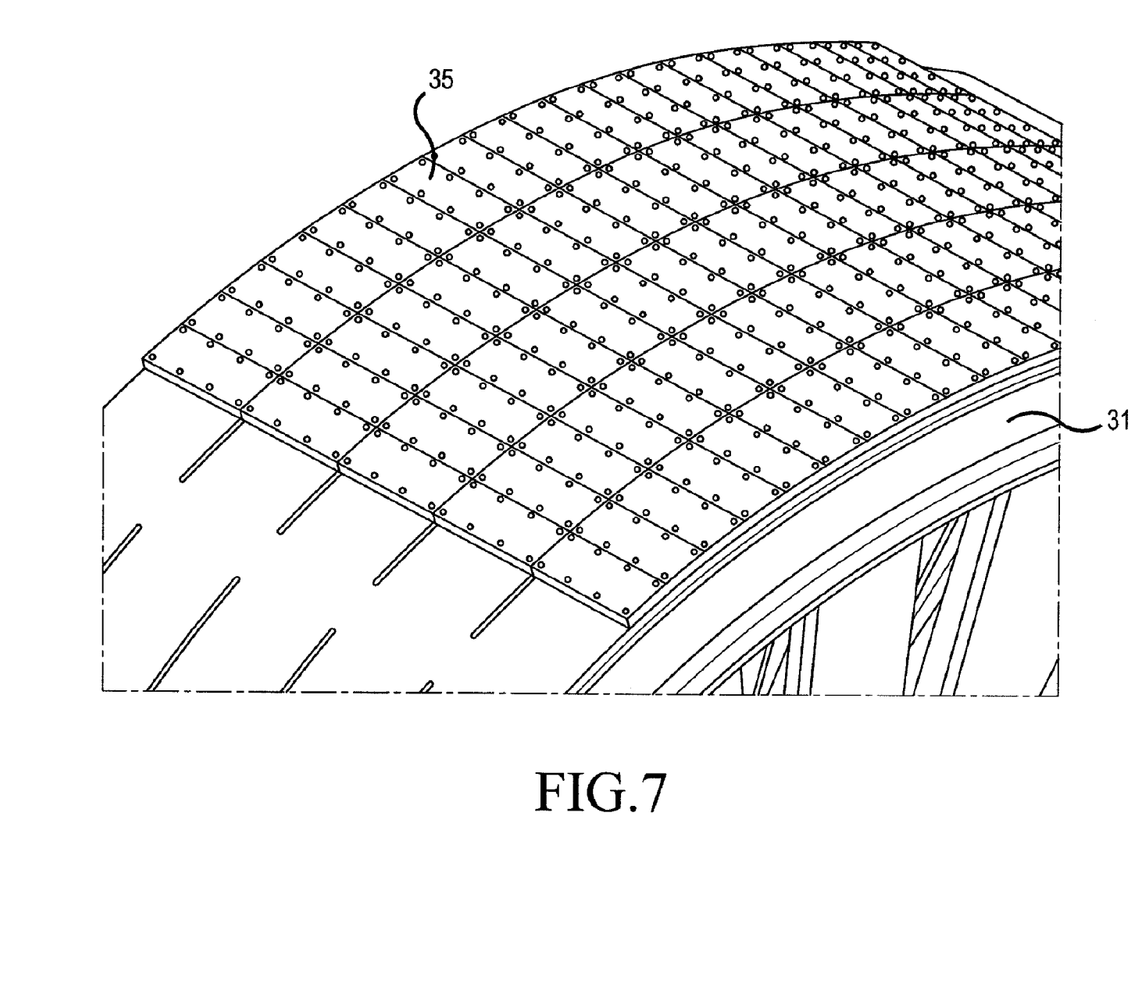
FIG. 7 presents permanent magnets.

The generator is permanent-magnet synchronous generator in which the rotor comprises a cylindrical outer part 31 and in which the frame is of cellular structure, consisting of plate-like end plate parts 32 and flange parts 33 between them, and a tubular central shaft 34 for connection to the shaft of the wind rotor. The cylindrical rotor 1 is fitted inside the stator and provided with permanent magnets 35 fastened to its surface (FIG. 7), so it need not be provided with windings at all.

Figure 5:
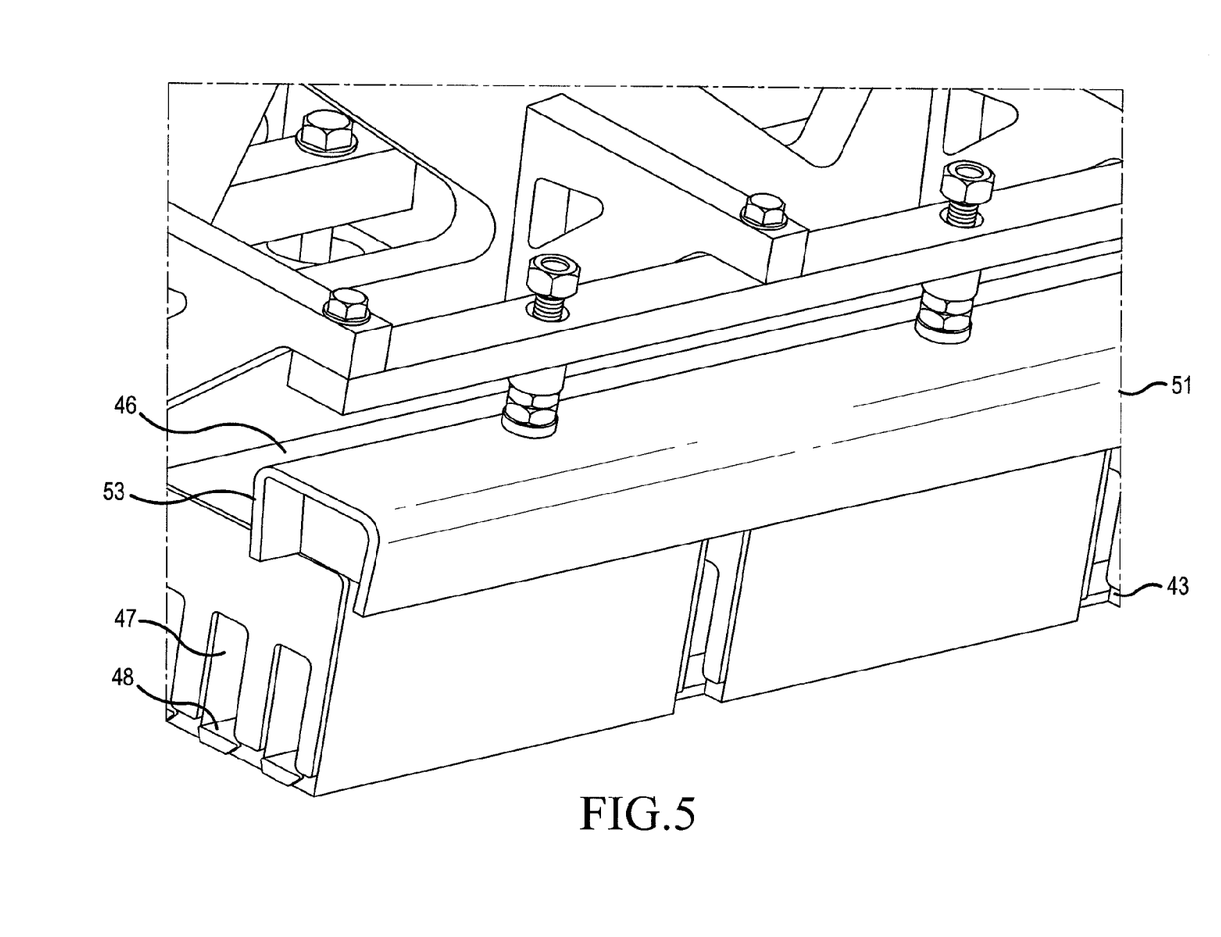
FIG. 5 presents a possible magnetic flux bridge.
Figure 6:
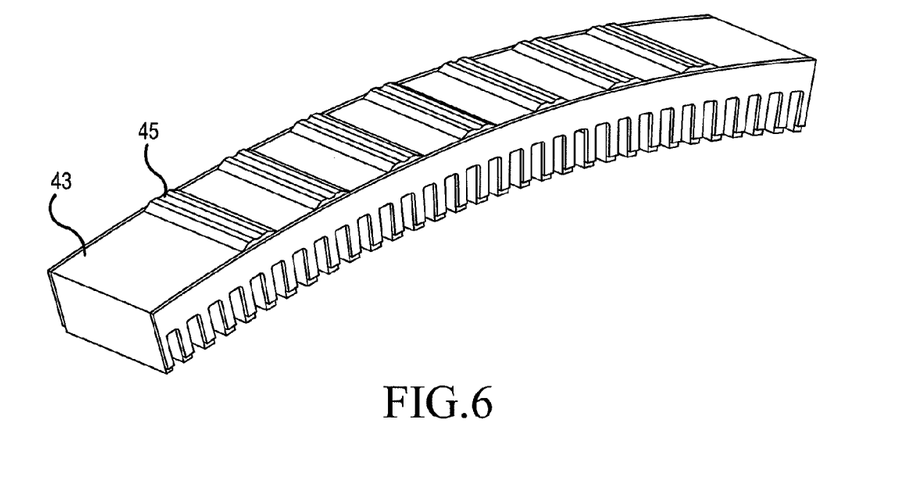
FIG. 6 presents the frame of the magnetic circuit of the stator pack.

The stator has a number of linear machine segments 2, e.g. 12 segments (FIG. 4), each of which segments is arranged at a small distance from the others, and which have above them a cellular supporting frame structure 40 consisting of a plurality of perforated ribs 41 resembling bridge beams laid in the longitudinal direction of the generator and parts 42 placed between them, wherein the stator segments are provided with successive stator winding cores 43 provided with profiled copper windings 44 fitted in each stator segment, said cores having slots 47 and slot wedges 48 for the windings, and wherein the stator packs thus formed are secured to the frame by a simple moveable restraint, e.g. with a T-bar 45 comprised in the pack and counterparts 46 provided in its frame (FIGS. 5 and 6).

Figure 9:
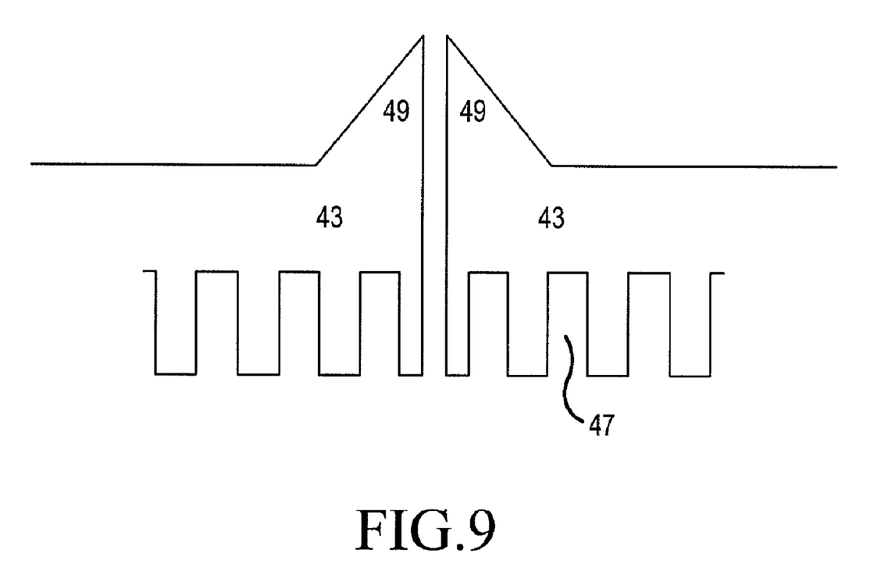
FIG. 9 presents a possible other alternative for implementing the structure of the ends of the segment.

In the solution of the invention, a magnetic flux bridge is provided between the segments to connect the linear machines along the above-described overhead frame structure to the generator when necessary by fastening a downward-opening longitudinal U-channel beam 51 to the overhead frame structure with a screw 52, in which channel beam is placed a magnetic flux bridge bar 53 (FIG. 5) which maintains a rotary field even across the gap between the stator segments. The discontinuity between the linear machines can also be alleviated by using a structure as illustrated in FIG. 9, wherein the iron part of the magnetic circuit is widened 49 at both ends of the linear machine so that the reluctance between the machines is reduced. The linear machines are thus better coupled in series and the assembly begins to resemble a large rotary-field machine.

Figure 8:
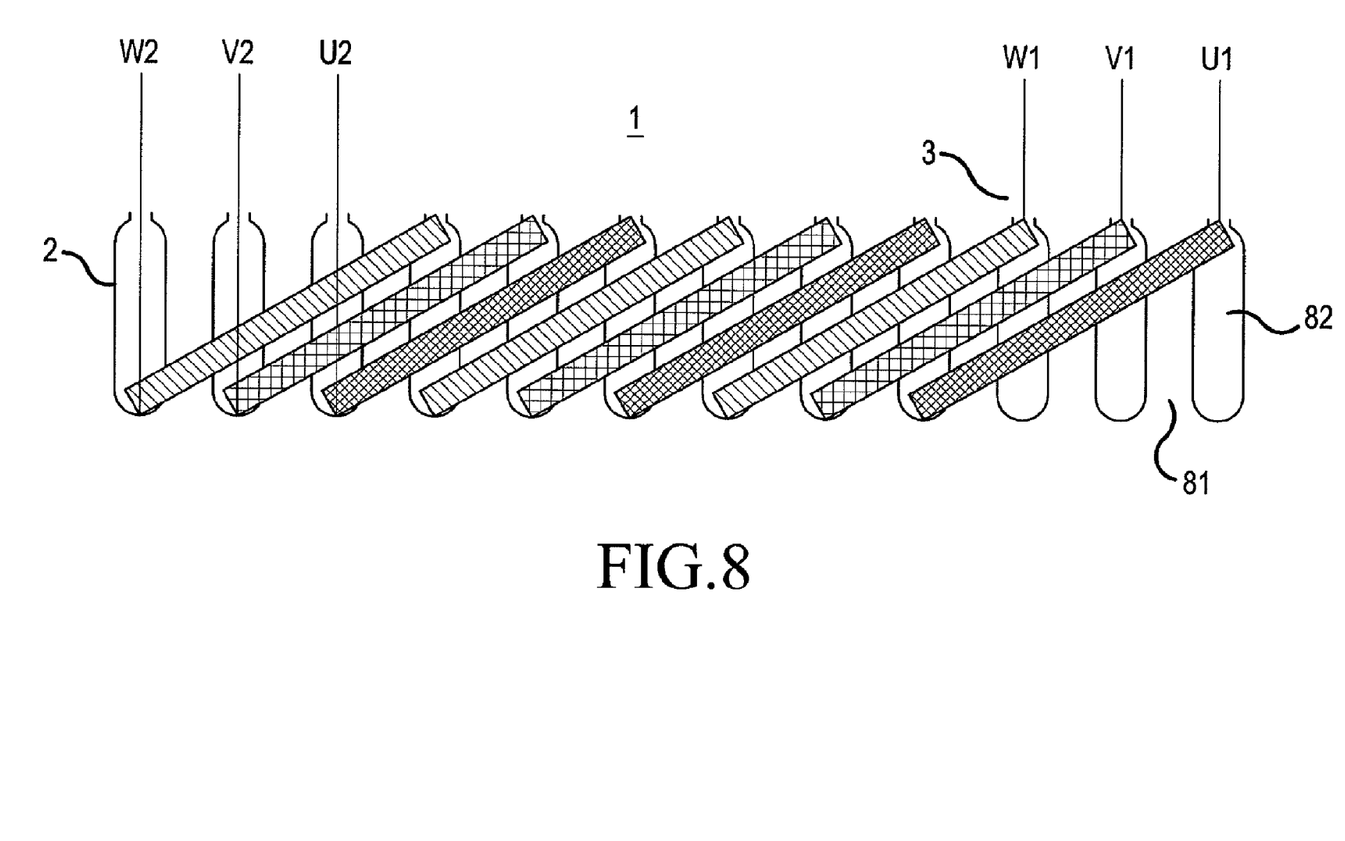
FIG. 8 illustrates an arrangement according to the invention for implementing the windings of the stator segment of e.g. a permanent-magnet radial-flux generator so as to make each segment independent and to allow them to be placed at small distances from each other.

In the solution of the invention presented in FIG. 8, the winding at the edge of the stator segment 81 only fills part of the slot 82. This can be arranged e.g. by leaving the first and last slots 2 for each phase U, V, W half-filled, in other words, the last coils, which should return from the last slots back to the slots at the starting end, are left unmounted. By using a half-coil diamond winding arrangement 3, the end of the winding will be symmetrical between different phases, and therefore no significant differences occur in phase inductance. The coil end can be easily shaped in comparison with edgewise winding, and no return leads are needed in the first slots at the starting end of the segment, space being thus saved at the coil end; in addition, the windings contain no intersecting conductors, so the coil end can be made short.

The solution of the invention reduces the intensity of the magnetic field in the end areas of the linear machines—a magnetic discontinuity is present between the machines—so the end phenomena of the linear machines are damped out.

The machine is assembled as follows:
1. The bearings and plates are mounted on the rotor.
2. The permanent magnets are mounted in the rotor, using special tools by means of which the forces can be controlled.
3. The stator segments are carefully deposited one at a time into position near the rotor, restraining them hydraulically or in some other suitable controlled manner.
4. The supporting structures of the stator are fastened to the end shields.

This structure and this assembly procedure make it possible to build the machine almost anywhere. No separate machine factory is needed.

It is obvious to the person skilled in the art that different embodiments of the invention are not limited to the example described above, but that they may be varied within the scope of the claims presented below. Besides a segment consisting of successive packs, the stator segment can also be assembled from a single part. In addition, some of the linear machines of the stator can be removed from the machine or disconnected to deactivate them e.g. during partial loads, in which case the machine will work without one or more segments.

The invention claimed is:

1. An electric machine comprising:
   an arched stator and a cylindrical rotor fitted inside the arched stator and in which flux flows in the radial direction between the stator and the rotor as in the case of a permanent-magnet radial-flux synchronous electric machine,
   wherein the stator of the machine comprises stator segments, and
      the stator segments are arranged to be physically separate from each other so that the stator comprises stator segments arched according to the radius of the rotor and working electromagnetically independently like a linear machine, each stator segment having a stator core and a winding separate from the other stator segments, the windings being arranged to fill a smaller portion of each winding slot formed in edge portions of each stator than slots in a middle portion of the respective stator segment, and
      an overhead supporting frame structure separate from the stator cores comprising several longitudinal ribs and parts between the longitudinal ribs.

2. The electric machine according to claim 1, wherein the supporting frame structure is provided with magnetic flux bridge elements placed between the linear machines to alleviate the end phenomena of the linear machines, or a magnetic circuit is widened at the ends of the linear machines so as to produce the same effect.

3. The electric machine according to claim 1, wherein stator packs of the linear machines are secured to the frame with a T-bar and its counterparts.

4. The electric machine according to claim 1, further comprising independent segments working like a linear machine, which, when connected mechanically in series, form a segmental structure.

5. The electric machine according to claim 4, wherein the stator comprises independent linear machines, one or more of which can be deactivated, removed or replaced.

6. The electric machine according to claim 1, wherein the degree of windings filling in the winding slots in the edge portions of each stator segment is at most 50%.

7. The electric machine according to claim 1, wherein electric machine is a three-phase electric machine; and
   wherein first and last slots for each phase (U, V, W) in each stator segment are only partially filled.

8. The electric machine according to claim 2, wherein stator packs of the linear machines are secured to the frame with a T-bar and its counterparts.

* * * * *